United States Patent
Voss

(10) Patent No.: US 7,469,857 B2
(45) Date of Patent: Dec. 30, 2008

(54) SYSTEM AND METHOD FOR ALTITUDE CONTROL

(75) Inventor: Paul B. Voss, Northampton, MA (US)

(73) Assignee: University of Massachusetts, Amherst, MA (US)

( * ) Notice: Subject to any disclaimer, the term of this patent is extended or adjusted under 35 U.S.C. 154(b) by 0 days.

(21) Appl. No.: 10/937,747

(22) Filed: Sep. 9, 2004

(65) Prior Publication Data

US 2006/0000945 A1    Jan. 5, 2006

Related U.S. Application Data

(60) Provisional application No. 60/501,548, filed on Sep. 9, 2003.

(51) Int. Cl.
*B64B 1/62* (2006.01)
(52) U.S. Cl. .......................... 244/97; 244/96
(58) Field of Classification Search ............ 244/96–99, 244/128, 24, 30–31, 61
See application file for complete search history.

(56) References Cited

U.S. PATENT DOCUMENTS

| 1,012,559 | A | * | 12/1911 | Kalaba | 244/5 |
| 1,056,503 | A | * | 3/1913 | Cooper | 244/128 |
| 1,477,338 | A | * | 12/1923 | Finley | 244/30 |
| 1,656,780 | A | * | 1/1928 | Diago | 244/24 |
| 6,527,223 | B1 | * | 3/2003 | Mondale | 244/30 |
| 6,648,272 | B1 | * | 11/2003 | Kothmann | 244/97 |
| 2002/0179771 | A1 | * | 12/2002 | Senepart | 244/97 |
| 2003/0127560 | A1 | * | 7/2003 | Liss | 244/30 |
| 2003/0234320 | A1 | * | 12/2003 | Colting | 244/96 |

* cited by examiner

*Primary Examiner*—Timothy D Collins
(74) *Attorney, Agent, or Firm*—Reinhart Boerner Van Deuren s.c.

(57) ABSTRACT

An differential expansion system and method for balloon buoyancy control which includes a zero-pressure envelope and a superpressure envelope. A gas transfer device is positioned between the envelopes to facilitate the transfer of lift gases that are lighter than air between the envelopes. The superpressure envelope and the gas transfer device can be located inside the zero-pressure envelope. Alternatively, the zero-pressure envelope, the superpressure envelope, and the gas transfer device can be located inside a zero-pressure envelope.

20 Claims, 9 Drawing Sheets

SYSTEM AND METHOD FOR ALTITUDE CONTROL

This application claims priority benefit of application Ser. No. 60/501,548 filed Sep. 9, 2003, the entirety of which is incorporated herein by reference.

The United States government has certain rights to this invention pursuant to Grant No. 0137589-0022210000-Mar. 31, 2003 from the National Science Foundation to University of Massachusetts.

BACKGROUND OF THE INVENTION

Field of the Invention

The present invention relates generally to high-altitude balloons, and more particularly to a system and method for controlling the buoyancy of balloons and airships.

The balloon was first invented in 1783 by the Montgolfier Brothers when they experimented with smoke-filled paper spheres. At the time, they believed that smoke had lifting power and that the worst smelling smoke had the best lift. To further add to this unique history, early scientists carried their instruments aloft with them to make pressure and temperature measurements. Some of them suffocated or died of exposure to the bitterly cold upper atmosphere.

Although balloons have been employed usefully for over 200 years now, it is only in recent years that the development of plastic films has made high altitude balloons possible. These films have permitted the manufacture of balloons that can reach the stratosphere and near space. High altitude balloons are designed to carry a payload into altitudes of 120,000 feet or higher, using lighter-than-air lift gases.

Balloons are currently used for a wide range of applications, including worldwide weather forecasting, scientific research (astronomy, and atmospheric chemistry and physics), surveillance, communications platforms, advertising, and recreation. Balloons can gather data for researchers in many discipline areas. For example, instruments on high-altitude balloons have carried out magnetosphere research and studied the magnetic field around the Earth and how it interacts with cosmic winds, as well as studies on micrometeorites and cosmic dust. Instruments carried by balloons have also performed planetary observations, visible light particle sampling, and pressure-temperature sensing. Geophysicists and earth scientists have used balloons to monitor earth resources, take pictures from the air, and study light from the aurora and constellations. Biologists and aerospace medical specialists have sent plants and animals into the upper atmosphere via balloons.

Furthermore, in the past, dirigibles and blimps (balloons with propulsion systems) have transported passengers and cargo around the world, served as coastal patrols and as airborne aircraft carriers. With recent advances in materials and growing enthusiasm from investors, it is likely that large airships will travel the skies in the future.

Nearly all balloons require some degree of buoyancy control. Thus, one of the key design elements of a balloon is buoyancy control. As is known by one skilled in the art, buoyant force is explained by the Archimedes' principle. Generally, buoyancy is the upward force exerted by a fluid on any body immersed in it. For example, a submarine or a ship can float because the weight of water that it displaces is equal to the weight of the ship. This displacement of water creates an upward force called the buoyant force and acts opposite to gravity, which would pull the ship down.

Similarly, by controlling the buoyancy, balloons can be driven up and down in the atmosphere or held at a constant altitude for long duration flights. Altitude control enables rudimentary navigation as balloons can be driven up or down, catching winds at different levels and sailing through the atmosphere. In this way, constellations of balloons can be maintained around the earth at a substantially fixed latitude. Such constellations are currently being developed for gathering weather data (e.g., NOAA GAINS Project) and as an economical alternative to satellites. Altitude control can even enable balloons to follow air parcels for tracking hazardous or pollution plumes. Thus, as can be seen, with buoyancy control, scientific experiments can be carried to specific altitudes while commercial (e.g., communications) and military platforms could benefit from rudimentary navigational ability.

Several types of systems are currently employed for controlling the buoyancy and altitude of atmospheric balloons. The first system for controlling buoyancy is the ballast and bleed system which is commonly employed because it is simple to implement. In this system, ballast (e.g., sand) is added to the balloon payload. Dropping the ballast decreases the total mass of the balloon, causing the balloon to rise. Bleeding the lift gas (e.g., helium) causes the balloon to fall. With the ballast and bleed system, flights are limited to duration of a day or two because of the limited amount of ballast and extra lift gas that can be carried by the balloon. Nonetheless, ballast and bleed systems continue to attract the attention of inventors (e.g., U.S. Pat. No. 4,457,477, issued to Regipa, and U.S. Pat. No. 4,547,167, issued to Bergmann). Except in very rare circumstances, the ballast and bleed system is not suitable for long flights or continuous altitude control because of its substantial weight penalty and finite operating time.

The second system for controlling balloon buoyancy is thermal regulation which is probably the oldest means of altitude control (first devised by Jean-Francois Pilatre de Rozier in 1785). Thermal regulation uses temperature to change the density of the lift gas in a zero-pressure balloon. Thermal regulation includes a balloon containing air that is heated by solar radiation (or other means, such as the common hot air balloon which uses a burner to heat air as the lift gas) to achieve positive buoyancy. Releasing the heated air (via an opening at the top of the balloon) causes the balloon to descend.

Many dirigibles and blimps use a variation on the thermal regulation method in which a lift gas (e.g., helium) is heated by combustion a product from a burner or, in the case of airships, from an engine exhaust (e.g., U.S. Pat. Nos. 3,856,236 and 3,976,265, issued to Doolittle). These thermal regulation systems can only operate as long as the fuel supply holds out. Thus, flight times are generally limited to hours or days at most.

At higher altitudes, thermal altitude control systems typically regulate the balance between incoming solar radiation and outgoing infrared radiation to control the temperature of the lift gas (e.g., U.S. Pat. No. 4,986,494, issued to Tockert). Other high-altitude thermal balloons use a hybrid system comprising a helium balloon for generating the main lift and a hot air balloon for altitude control (e.g., U.S. Pat. No. 5,076,513, issued to Regipa et al.). For a given size, thermal balloons have significantly less lift than helium or hydrogen filled balloons. Thermal altitude control is sensitive to spatial and temporal variations in the radiation field and is, therefore, difficult to implement where high-precision control is desired.

The third system for controlling balloon buoyancy is propulsion-based altitude control. The propulsion-based altitude control system uses the force from a propulsion system to change the altitude of a balloon that is at substantially neutral density. The propulsion-based altitude control system is widely used on dirigibles and blimps, and typically includes one or more engines with propellers to drive the airship forward and fins with control surfaces to point the airship upwards to ascend or downwards to descend (e.g., U.S. Patent Application No. 20020134884 of Perry, published 2002). Other propulsion-based systems control altitude in the manner of a helicopter (e.g., U.S. Pat. No. 4,114,837, issued to Pavelecka; and U.S. Pat. Nos. 3,856,236 and 3,976,265, issued to Doolittle). In all of these systems, the propulsion system must operate continuously to counteract any tendency of the balloon or airship to ascend or descend and thus energy consumption is high. In addition, the poor aerodynamic properties of balloons and airships cause very substantial inefficiencies which further increase the system weight and energy consumption.

The fourth system for controlling balloon buoyancy is aerodynamic altitude control. This concept, being developed by Global Aerospace Corporation of Altadena, Calif., uses differences in the wind at different altitudes to "sail" a balloon in the atmosphere. This concept is implemented by suspending a small upside-down glider far beneath the balloon; the glider flies through the "faster wind" in the lower atmosphere and drags the balloon with it. Control surfaces on the glider change its angle of attack and enable varying degrees of downward, crosswind, and down-wind force to be applied to the balloon. Thus, the balloon has some navigational ability in all three dimensions.

The aerodynamic altitude control system, while innovative, is also likely to be expensive and relatively heavy. In particular, the long suspension line (up to several kilometers in length) and mechanical complexity of the glider make it one of the more difficult options for altitude control. Furthermore, since the aerodynamic altitude control system relies on differences in wind speed, its performance will change with altitude, latitude, and season. The long suspension cable can also present a hazard to aviation, precluding the use of the aerodynamic altitude control system throughout most of the atmosphere.

The fifth system for controlling balloon buoyancy is cryogenic altitude control. The cryogenic altitude control system uses a cryogenic storage for storing the lift gas. To ascend, the lift gas is vented from a cryogenic reservoir into a zero-pressure balloon. To descend, the lift gas is vented from the zero-pressure balloon into the atmosphere. Advantages of the cryogenic altitude control system include a small storage volume and the ability to replenish lift gas that diffuses or leaks out of the balloon envelope. The cryogenic reservoir, however, can only hold a finite volume of lift gas, and furthermore, gas must be bled off continuously to maintain the cryogenic temperature. Thus, flight duration is limited. The problems of limited flight time become even more acute with small balloons, which suffer from high diffusional and thermal losses relative to their volume.

In a sixth system, air ballasting, which is one of the newest systems for balloon altitude control, a constant-volume (e.g., superpressure) balloon is filled with lift gas and contains an internal air bladder. A pump inflates the internal bladder with ambient air, adding mass to the constant-volume balloon and causing the balloon to descend. Conversely, deflating the internal air bladder causes the balloon to rise. The air ballasting system has been proven effective and is currently used for small scientific balloons that follow air parcel trajectories in the lower atmosphere. As one example, U.S. Pat. No. 5,645,248, issued to Campbell, discloses a spherical airship with both a propulsion system and an air ballast balloonet for controlling altitude in which heavy gas can be pumped into and out of the second balloonet to control the altitude of the apparatus.

The idea for air ballasting appears to be derived from the balloonets used to control the pitch of dirigibles and blimps. In dirigibles, the lift gas is stored in zero-pressure balloonets suspended within the superstructure of the airship. Pumping the lift gas from the aft balloonets to the fore balloonets, for example, would cause the nose of the airship to pitch upwards. Blimps, which have no superstructure, can utilize a similar system of balloonets containing the lift gas, or they can have a single large chamber of lift gas in which air filled balloonets expand or contract to displace the center of lift. While the entire blimp is essentially a zero-pressure vehicle, air ballasting, however, achieves much higher internal pressures and therefore requires very strong envelope materials that have only recently become available.

Despite the success of air ballasting and its widespread adoption as the method of choice in recent scientific and patent literature, this type of altitude control system has several significant shortcomings. At the highest design altitude, the superpressure balloon must contain the entire volume of the lift gas. Since the lift gas expands approximately exponentially with altitude, the volume of the superpressure balloon becomes prohibitively large at high altitudes. It is noteworthy that the superpressure balloon adds significant weight and cost to the system in comparison to a traditional zero-pressure balloon. Furthermore, for a given superpressure, the stress on the envelope, and therefore the strength of the envelope material required, increases in direct proportion to the radius of the balloon. Stronger (and heavier) envelope materials are required not only to protect against catastrophic failure, but also to prevent creep (as discussed in U.S. Pat. No. 5,104,059, issued to Rand et al.). Finally, any altitude change requires that the pump compress not only the lift gas, but also any air ballast that has been added. Thus, as can be seen, extra energy required to change the altitude of an air ballast balloon 1) at low altitudes by the parasitic mass of the ballast air and 2) at high altitudes by the large volume of the superpressure balloon decreases the efficiency of the air ballasting system significantly. Because of these shortcomings, air ballast systems are relatively expensive and are generally limited to low altitudes less than substantially ten kilometers.

A modification of the air ballast altitude control system was implemented in the 1990's. This hybrid air ballast system comprised a superpressure air-ballast envelope and a zero-pressure envelope joined together as a single balloon. The buoyancy of the air ballast envelope (known as an anchor balloon), could be regulated, and thus used to control the altitude of the hybrid balloon. In comparison with a simple air ballast balloon, the hybrid air ballast system achieves higher efficiency for altitude control. In fact, the efficiency approaches and can even exceed the high efficiency of direct compression (as will described below) in the limit of an infinitesimally small air ballast envelope (entire lift provided by the zero-pressure envelope). The trade-off, however, is an excessively high superpressure within the air ballast envelope. Furthermore, because the hybrid air ballast system is fundamentally based on air ballast, the hybrid air ballast system has many of the disadvantages of the air ballast system described previously (most importantly the low energy efficiency in affecting altitude change).

The seventh system for controlling balloon buoyancy, fluid vaporization, includes a fluid and its vapor (and sometimes an additional lift gas) within a zero-pressure balloon. Vaporizing the fluid increases its volume and therefore increases the volume and buoyancy of the zero-pressure balloon. Condensing the fluid decreases buoyancy of the balloon. Vaporization and condensation of the fluid can be regulated either actively (via heating or cooling of the fluid) or passively by means of changing ambient conditions (i.e., temperature and pressure) to achieve altitude control or stabilization.

U.S. Pat. No. 4,172,048, issued to Dunlap discloses an altitude control system based on liquid-gas phase transitions of an ammonia/n-hexane. U.S. Pat. No. 4,993,664, issued to Kneeland, discloses a device which, through evaporation, supplies water vapor to a balloon envelope, balancing the loss of lifting gas that diffuses through the balloon. U.S. Patent Application No. 20030052223 of Izutsu (published 2003) discloses a balloon inflated by water vapor released from an absorbent sheet on the interior surface of the balloon envelope while U.S. Patent Application No. 20030062444 of Goodey (published 2003) discloses a balloon that uses steam for buoyancy control. In all of these fluid vaporization systems, the phase of the fluid itself is extremely sensitive to ambient temperature and pressure. The fluid vaporization system, must therefore be designed to operate within a relatively small range of temperatures and pressures and is therefore best suited for passive stabilization within a narrow altitude band.

The eighth system for controlling balloon buoyancy is direct compression which includes a superpressure balloon that is compressed by means of a winch or other constriction device. This system of buoyancy control was proposed and tested (unsuccessfully) by Solomon Andrews in the 1860's. Direct compression is difficult to implement because of the large forces involved and the limited altitude range that can be covered. An example of the direct compression system is disclosed in U.S. Patent Application No. 20030106960 of Yajima et al. (published 2003) in which Yajima et al. outline some of the advantages of the direct compression system over the air ballast system.

As mentioned above, air ballast balloons suffer from greatly decreased efficiency due to the air ballast itself acting as a parasitic load that, in addition to the lift gas, must be compressed to effect a change in altitude. Direct compression achieves a much higher efficiency for any altitude change. Thus, a direct compression balloon requires a smaller and lighter energy source (e.g., batteries and solar panel) than an air ballast balloon.

However, direct compression altitude control has some serious shortcomings not mentioned by the Yajima et al. application. First, as with air ballast systems, the superpressure balloon must be large enough to accommodate all of the lift gas at the highest design altitude. Furthermore, the superpressure balloon must be designed to withstand exactly the same maximum pressure as an air ballast balloon. Because of this, the direct compression superpressure balloon is large, relatively heavy, and expensive.

Furthermore, direct compression has its own inherent shortcomings that make it difficult to implement in practice. First, a full compression of the balloon (base and apex of the balloon in contact) reduces its volume by only approximately 50%, corresponding to change in altitude of substantially four kilometers in the Earth's atmosphere. Difficult-to-implement equatorial constriction schemes, as suggested by the Yajima et al. application, could increase this altitude range by a small amount, but does not solve the problem. Furthermore, the compression itself is extremely difficult in practice. For example, a 9-meter balloon would require a light-weight (substantially 1 kg) winch capable of generating forces equivalent to 2000 kilogram over several meters of travel. This is approximately 100 times the lift to weight ratio of a high-quality small commercial winch. In addition, when the balloon is compressed, it becomes severely contorted, a condition not anticipated in the Yajima et al. application.

Of all the above-described systems for regulating balloon buoyancy, only thermal regulation, air ballasting, fluid vaporization, and direct compression are efficient enough to be used on flights of more than few a days. Of the remaining four systems, only air ballasting, fluid vaporization, and direct compression offer precision altitude control.

Furthermore, of the remaining three options (air ballasting, fluid vaporization, and direct compression), fluid vaporization is effective for passive regulation of altitude within a predetermined range, but is sensitive to variations in ambient temperature. Precision altitude control using the fluid vaporization method would require a large energy source for vaporization or heavy refrigeration equipment for fluid condensation. Thus, only air ballasting and direct compression can be used for precise and efficient altitude control over extended periods of days to years. However, air ballasting and direct compression also have their own limitations and disadvantages which will be discussed further. Therefore, there remains a need for a balloon design with altitude control capabilities that are cost-effective, mechanically simple and energy efficient.

It is accordingly an objective of the present invention to provide a differential expansion system which combines the mechanical simplicity of air ballasting, the low cost of fluid vaporization, and energy efficiency of direct compression to achieve an degree of performance for altitude control that is superior to the existing systems. It is a further objective to provide an aneuric altitude control system suited for applications where light weight, low cost, low power consumption, and maximum altitude range are desired. It is a related objective of the present invention that it provide an altitude-controlled balloon that is highly energy-efficient. It is another related objective of the present invention to provide an altitude-controlled balloon that is capable of traveling over a large altitude range and is suitable for long duration flights. Accordingly, it is another object of this invention to provide a system or balloon apparatus for continuous operation, up to 2 years or more, using regenerative power such as that available through photovoltaic cells.

It is a further objective that the present invention provide an altitude-controlled balloon that uses a relatively small superpressure envelope. It is a related objective of the present invention that it provide an altitude-controlled balloon that minimizes stress on the superpressure envelope. It is another related objective to provide an altitude-controlled balloon that is configured to contain gas leaks from the high-pressure envelopes to within the zero-pressure envelope. Yet a further objective of the present invention is to provide an altitude-controlled balloon that minimizes day-to-night temperature changes of the lift gas. Another objective of the present invention is to provide an altitude-controlled balloon that does not require ambient air to be pumped into a balloonet and thus is less susceptible to ice damage.

It is yet a further objective of the present invention to provide an altitude-controlled balloon that is simple, light-weight, inexpensive, and easy to fabricate. It is another objective of the present invention to provide an altitude-controlled balloon that presents a lower hazard to aviation.

Yet another objective of the present invention is to provide means for controlling altitude for taking scientific data, landing, or taking advantage of favorable winds for relocation. Further objects and advantages of the present invention are to provide a balloon that can be used for atmospheric soundings, for air mass tracking, for navigation in the atmosphere, and for creating satellite-like constellations for communications, observations, and scientific studies. Still further objects and advantages will become apparent from the ensuing description and drawings.

The differential expansion system of the present invention should, in certain embodiments, also be of construction which is both durable and long lasting, and the system should also require little or no maintenance to be provided by the user throughout its operating lifetime. In order to enhance the market appeal of the balloon apparatus and/or differential expansion system of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, a differential expansion system for balloon buoyancy control is provided which includes a zero-pressure envelope or enclosed volume compartment, and a superpressure envelope or enclosed volume compartment. A gas transfer device, in fluid connection with the envelopes, transfers a lift gas (e.g., helium) between a zero-pressure envelope and a superpressure envelope. When the gas transfer device releases the lift gas from the superpressure envelope into the zero-pressure envelope, the zero-pressure envelope grows, causing the total volume of the differential expansion system to increase and the balloon to ascend. When the gas transfer device pumps the lift gas from the zero-pressure envelope into the superpressure envelope, the total volume of the differential expansion system decreases and the balloon descends. As the balloon of the differential expansion ascends and descends, it may act as a sounding system or a platform for acquiring, for example, meteorological data. The balloon can also carry onboard sensors and/or dropsondes to acquire meteorological, air chemistry, and climate data in remote regions of the globe.

In part, the present invention provides a method of using lift gas volume to control balloon altitude. Such a method includes (1) providing a balloon comprising first and second envelopes, the first envelope volume being flexible and the second envelope being substantially volume constant, and a lift gas in both envelopes, and the second envelope at a pressure greater than ambient; and (2) transferring the lift gas between envelopes, with the lift gas transferred in an amount sufficient to change the sum envelope volume. As would be understood by those skilled in the art, a volume flexible envelope of this invention can be distinguished structurally from the prior art by the absence of a rigid non-inflatable component peripheral thereto. From an alternate perspective, again as distinguished from the prior art, the volume flexible envelope is substantially absent fluid communication (i.e., fluid or gaseous contact, interaction or exchange) with ambient and/or atmospheric conditions. Lift gas transferred at least partially from the first volume flexible envelope to the second volume constant envelope decreases the sum envelope volume and the balloon altitude. Conversely, lift gas transferred at least partially from the volume constant envelope to the volume flexible envelope increases the sum envelope volume and the balloon altitude.

In certain embodiments, as discussed more fully below, the first envelope has a volume sufficiently flexible to receive substantially the entirety of the lift gas at a highest, pre-determined, operational altitude. The second envelope has a volume sufficient to substantially maintain the balloon at a lowest, pre-determined operational altitude. Regardless, depending upon operational efficiency, the second envelope can have a volume from about that sufficient to maintain such altitude to less than about 10% of such volume.

Notwithstanding envelope volumes or operational altitudes, various embodiments of this invention, including but not limited to those provided in FIGS. 2a-b comprise a second envelope within the first envelope. Optionally, one or more components of an accompanying payload can also be positioned within the first envelope. Regardless of payload position, such embodiments can be used where resulting sum volume change can affect the flight or control of a lighter-than-air craft.

Alternatively, the present invention provides a method of using a volume flexible envelope to control the atmospheric altitude of a balloon. Such a method includes (1) providing a balloon comprising first and second envelopes, the first envelope volume being flexible and the second envelope being substantially volume constant, and a lift gas in both envelopes; and (2) transferring the lift gas between envelopes, such transfer in an amount sufficient to change the volume of the first envelope and corresponding balloon altitude. Lift gas transferred at least partially from the first envelope to the second envelope decreases the volume of the first envelope and the atmospheric altitude of the balloon. Conversely, lift gas transferred at least partially from the second compartment to the first compartment increases the volume of the first compartment and corresponding atmospheric altitude.

In another aspect, the present invention provides a compact configuration of the differential expansion system in which the first/zero-pressure envelope completely surrounds the remaining elements of the differential expansion system. For example, one or more of the following components, including the gas transfer device, the second/superpressure envelope, the payload and other necessary parts used in facilitating buoyancy control can be located within the zero-pressure envelope.

In an embellishment, the present invention provides a method for balloon buoyancy control of an airship apparatus for subsequent ascent to high altitude with a payload. The method includes forming a hull for the airship from a flexible containment envelope by inflating the flexible containment envelope with a lighter than air gaseous medium. The method also includes providing a superpressure envelope with a substantially constant volume for storing the lighter than air gaseous medium in which the superpressure envelope is located inside the hull. The flexible containment envelope contains any leakage of lift gas from the superpressure envelope to within the flexible containment envelope. Further, the method provides a gas transfer device, placed inside the hull, for transferring the gaseous medium between the flexible containment envelope and the superpressure envelope. Means for supporting the payload for the airship apparatus can be located inside or outside the hull. Thus, the payload can be located inside or outside the hull.

The present invention further provides an enhancement to lighter-than-air ("LTA") crafts by integrating the differential expansion system of the present invention with an airship (e.g., a blimp). Preferably, the airship has a shape and structure that enable the airship to fly and maneuver. For example, the airship can include a low-pressure envelope which encloses a superpressure envelope and two zero-pressure envelopes. The zero-pressure envelopes are deflated or inflated to make the airship descend or ascend, respectively. The airship can also include a low-pressure gas-transfer device which serves to maintain the low-pressure envelope in a fully inflated and substantially rigid form.

Furthermore, the present invention can work in combination with satellite technology to provide a complementary global observing system in which the present invention can sense the environment in ways satellite technology cannot, and vice-versa. This combination provides more detailed knowledge of the oceans and atmosphere.

It may therefore be seen that the present invention teaches an inexpensive and efficient buoyancy control system and method for use in high altitude balloon applications. The present invention is designed for long life and weighs less (and therefore costs less) than do previously developed long-life balloon systems. The differential expansion system and methods of the present invention can be applied to, for example, scientific research, long-duration weather forecasting, "satellite" communications, air mass tracking beacons, surveillance platforms and altitude control airships. Succinctly, the present invention provides a simplified and efficient buoyancy control system and method and increases the number of potential industry application for atmospheric balloons.

It may be further seen that the present invention provides a differential expansion system which combines the mechanical simplicity of air ballasting, the low cost of fluid vaporization, and energy efficiency of direct compression to achieve an degree of performance for altitude control that is superior to the existing systems. The present invention provides an aneuric altitude control system that is suited for applications where lightweight, low cost, low power consumption and maximum altitude range are desired. The present invention further provides an altitude-controlled balloon that is highly energy efficient. Additionally, the present invention provides an altitude-controlled balloon that is capable of traveling over a large altitude range and is suitable for long duration flights.

Further, the present invention provides an altitude-controlled balloon that uses a relatively small superpressure envelope and an altitude-controlled balloon that minimizes stress on the superpressure envelope. The present invention also provides an altitude-controlled balloon that is configured to contain gas leaks from the high-pressure envelopes to within the zero pressure envelope, thus increasing flight duration considerably. The present invention also allows for greater flexibility in design and material selection because the zero-pressure envelope is easily modified, for example, to minimize the day-to-night temperature changes of the lift gas. Furthermore, the present invention provides an altitude-controlled balloon that does not require ambient air to be pumped into a balloonet and thus is less susceptible to ice damage.

In addition, the present invention provides an altitude-controlled balloon that is simple, lightweight, inexpensive, easy to fabricate and presents a lower hazard for aircraft and general aviation. The present invention further provides means for controlling altitude for taking scientific data, landing, or taking advantage of favorable winds for relocation. Further advantages of the present invention includes using the balloon for atmospheric soundings, for air mass tracking, for navigation in the atmosphere, and for creating satellite-like constellations for communications, observations, and scientific studies.

The differential expansion system of the present invention is of a construction which is both durable and long lasting, and which will require little or no maintenance to be provided by the user throughout its operating lifetime. The differential expansion system of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 2b shows another embodiment similar to the compact embodiment of FIG. 2a;

DETAILED DESCRIPTION OF THE CERTAIN EMBODIMENTS

Certain embodiments of this invention provide an apparatus and/or system for balloon buoyancy control which includes a first/zero-pressure envelope and a second/superpressure envelope. A gas transfer device is in fluid communication with the envelopes to facilitate the transfer of lift gases (e.g., helium, hydrogen, methane, ammonia, hot air, and others known in the art) between the envelopes.

Figure 1:
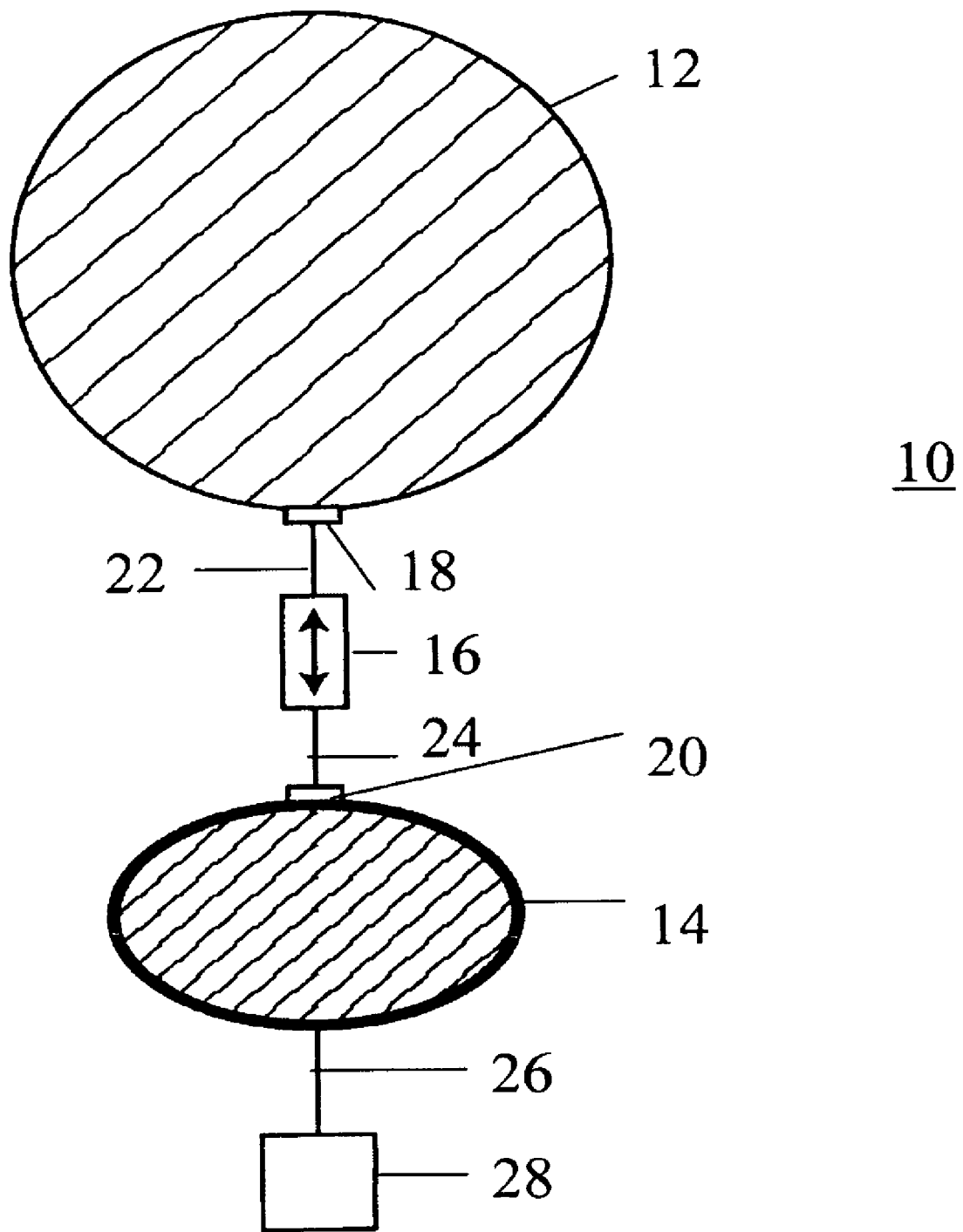
FIG. 1 is a simplified representation of a differential expansion system in accordance with the principles of the present invention.

Referring first to FIG. 1, there is shown a schematic block diagram of a differential expansion system 10 in accordance with the principles of the present invention. In this aspect, the differential expansion system 10 includes a zero-pressure envelope 12, a superpressure envelope 14, a gas transfer device 16, connection fittings 18 and 20, gas lines 22 and 24, a payload support line 26, and a payload 28. The gas transfer device 16 is located between the zero-pressure envelope 12 and the superpressure envelope 14 in fluid communication with and for facilitating the transfer of gas from the envelopes 12 and 14. The connection fittings 18 and 20 of the zero-pressure envelope 12 and the superpressure envelope 14, respectively, allow the gas transfer device 16 access to gases inside the zero-pressure envelope 12 and the superpressure envelope 14. The gas lines 22 and 24 are interposed between the gas transfer device 16 and the connection fittings 18 and 20, respectively. The superpressure envelope 14, via the payload support line 26, carries the payload 28. As will be apparent, the zero-pressure envelope 12 and the superpressure envelope 14 are designed to carry aloft the payload 28 secured to the superpressure envelope 14.

For the purposes of illustration, the zero-pressure envelope 12 can be, for example, a standard latex rubber (e.g, a weather balloon) or polyethylene film. In particular, the zero-pressure envelope 12 can be constructed from a film substantially 0.0025 to 0.05 millimeter in thickness, such as balloon-grade polyethylene, Mylar (a material marketed by DuPont Teijin Films under the trademark MYLAR), metalized nylon, rubber, or some other film having reasonable strength and good gas-retention characteristics. Furthermore, the zero-pressure envelope 12 can be constructed of a low-emissivity, high reflectivity material such as aluminum or silver coated film in order to minimize nighttime cooling. The zero-pressure envelope 12 can take on various forms including a cylinder, a tetrahedron, a sphere, or any number of variations of a natural shape balloon.

Similarly, the superpressure envelope 14 can be constructed from similar materials as the zero-pressure envelope 12 so long as high-strength tendons are used to create a small radius of curvature and, in certain embodiments, everywhere on the superpressure envelope 14. For example, the superpressure envelope 14 can be wrapped with high-strength tendons (e.g., like a pumpkin balloon) or even enclosed in a high-strength fabric shell (e.g., #6611 sail cloth commercially-available from Putnim Sails, or Spectra fabric, as used in NOAA Smart Balloons).

Preferably, the superpressure envelope 14 is constructed from a stronger material than the zero-pressure envelope 12, such as a fabric film composite or a polyester film (e.g., a high-strength film such as a laminate of #6611 high-performance sail cloth and Mylar available through Raven Industries). The superpressure envelope 14 does not change size greatly and maintains a generally constant volume. The superpressure envelope 14 has a tough and preferably inelastic envelope that is filled with a lift gas to a pressure higher than that of the external atmosphere. The superpressure envelope 14 can be of many forms, including a sphere, a tetrahedron, a cylinder, or a polygon.

Alternatively, the superpressure envelope 14 and/or the zero-pressure envelope 12 can include a special coating and/or shading members which minimize day to night temperature change, solar heating and/or infrared cooling of the lift gas. For instance, the maximum superpressure within a superpressure envelope is proportional to the daytime heating and nighttime cooling of the lift gas. Since it is advantageous to reduce this superpressure as much as possible, for optimal function and operation, a balloon will have minimal heating during the day and minimal cooling at night. In other words, the balloon will maintain the lift gas as close as possible to ambient temperature at all times. This can be achieved, for example, by constructing the zero-pressure balloon from a low-emissivity material, such as metalized nylon, in order to minimize the radiative loss of heat to space. Shading the balloon with an umbrella-like structure provides a similar reduction in required superpressure by minimizing solar heating of the lift gas during the day. Other means of minimizing heating and cooling transitions, such as, but not limited to, building the envelopes from transparent or white materials, changing their geometries and orientations to minimize or control solar absorption, or using caps of low-emissivity material to reduce nighttime cooling, will be apparent to those skilled in the art made aware of this invention.

Referring still to FIG. 1, the gas transfer device 16 can be a diaphragm pump (not shown) operating in the on/off mode, and together with a pinch valve (not shown), provide fluid connection for the zero-pressure envelope 12 and the superpressure envelope 14. The pinch valve includes a piece of soft silicone tubing that can be pinched shut by a servo motor (not shown). The pinch valve and diaphragm pump operate in fluid parallel. When the servo motor moves to one end of its range, the servo motor uncompresses the silicone tubing and allows the lift gas to flow through the silicone tubing from the superpressure envelope 14 to the zero-pressure envelope 12 (thereby causing the differential expansion system 10 to ascend). When the servo motor moves to the other end of its range, the pinch valve is closed. Because the diaphragm pump resists back flow (it acts as a check valve), no lift gas flows from the superpressure envelope 14 to the zero-pressure envelope 12. Conversely, turning on the diaphragm pump when the pinch valve is closed results in the transfer of lift gas from the zero-pressure envelope 12 to the superpressure envelope 14 (thereby causing the differential expansion system 10 to descend).

As can be seen, there are loosely three modes of operation for the gas transfer device 16: (1) increase buoyancy (pinch valve opened or momentarily opened, pump off); (2) hold (pinch valve closed and pump off); and (3) decrease buoyancy (pinch valve closed, pump on). The degree of buoyancy change is controlled by the amount of time in any particular mode. For example, pulsing the pinch valve on for a fraction of a second may lead to slow ascent, while leaving it open for a few seconds leads to much faster ascent.

Preferably, the gas transfer device 16 (e.g., comprising a diaphragm pump and pinch valve) is controlled by an on-board computer or microcontroller (not shown). The on-board computer collects and processes data on ambient conditions (e.g., pressure, temperature, and/or water vapor concentration, etc.) and/or receives inputs from a global position system ("GPS") and/or similar systems. Additionally, the on-board computer may receive commands from a computer or operator on the ground (via satellite modem, radio frequency link, etc.). The ground operator or computer may guide the differential expansion system 10 to particular altitudes based on, for example, numerically modeled wind fields, sounding goals, target altitudes, and may use information relayed from the differential expansion system 10 in the control decisions.

Although one particular control system is described herein for the transfer device 16, one skilled in the art recognizes that there are many other possible control systems that can be incorporated into the differential expansion system 10 of the present invention. For example, the gas transfer device 16 can include a pump (e.g., the diaphragm pump as described above), a blower, a fan, a multi-stage axial fan, a turbine, a centrifugal pump, a piston pump, a cryogenic pump or any other device capable of moving the lift gas from a low pressure to a higher pressure balloon or envelope. Furthermore, the gas transfer device 16 can contain provisions (e.g., a release valve mechanisms) for releasing the lift gas from the superpressure envelope 14 into the zero-pressure envelope 12, such as the pinch valve described above, a ball valve, a gate valve, a reversible pump or any other device(s) capable of controlling a flow of gas. The gas transfer device 16 can also have check valves, solenoids, or other means to prevent backflow when the gas transfer device 16 is not operating.

As apparent from the referenced embodiment, the gas transfer device 16 is a bi-directional gas-transferring apparatus capable of pumping gas out of and into the superpressure envelope 14. However, in other applications of the present invention (e.g., one-time, disposable flight), the gas transfer device 16 may be an unidirectional pump or release valve.

Optionally, the gas transfer device 16 can include provisions for generating power when gas is released so that some of the energy used in pumping process may be recovered by the differential expansion system 10 of the present invention. For example, the gas transfer device 16 can, through the means of a small turbine or other generating system, produce power when the lift gas is released into the zero-pressure envelope 12, thus recovering some of the energy used during the pumping phase.

Referring now to other peripheral elements of the differential expansion system 10, the gas lines 22 and 24 can be made from any type of suitable tubing or pipe, including, for example, silicone, vinyl, polyethylene, nylon, or aluminum tubing. The fittings 18 and 20 can also comprise many possible materials and designs. For example, the fittings 18 and 20 can be polyethylene washers that are heat sealed to the balloon envelope and serve as a small orifice for a tight-fitting piece of silicone tubing. The fittings 18 and 20 can also be of the barbed or locking type, either heat sealed, glued, or fastened mechanically to the zero-pressure envelope 12 and the superpressure envelope 14 or to the "neck" of the zero-pressure envelope 12 and the superpressure envelope 14.

The payload support line 26 is, for example, a tether line which enables the differential expansion system 10 of the present invention to transport instrument packages, such as the payload 28, to a location where measurements are to be taken by the instrument packages. The payload support line 26 can be a cord, line, or wire of sufficient strength to secure the zero-pressure envelope 12 and the superpressure envelope 14 together to the payload 40. The payload support line 26 can be attached directly to the zero-pressure envelope 12 and the superpressure envelope 14. Alternatively, the payload support line 26 can be fastened to enclose the zero-pressure envelope 12 and the superpressure envelope 14 in a loose-net like fashion.

Any number of the payload support line 26 may be used, as is appropriate for the strength of each payload support line 26 and the weight of the payload 28. Preferably, the payload support line 26 is made from a material that has a high strength to weight ratio. In addition, the payload support line 26 is attached to the superpressure envelope 14 in a manner that minimizes stress at any one particular point, by techniques known in the art. The payload support line 26 also couples the payload 28 to the differential expansion system 10 in manner that minimizes oscillatory motion during ascent and descent. In addition, the payload support line 26, the gas line 22, and the fitting 18 are preferably configured to allow the zero-pressure envelope 12 to change volume as the differential expansion system 10 changes altitude.

As shown in FIG. 1, the payload support line 26 is attached to the superpressure envelope 14 and may be controllably released by, for example, a winch (not shown). One or more instrument packages are attached (via the payload 28) to the payload support line 26 to perform the desired measurements.

The payload 28 can include such components as batteries, photovoltaic cells, a computer, transmitter and receiver for communications, sensors, and optionally the gas transfer device 16. The payload 28 is shown suspended beneath the zero-pressure envelope 12 and the superpressure envelope 14 in FIG. 1, but can optionally be located anywhere on, in, or outside of the zero-pressure envelope 12 and the superpressure envelope 14, or can be distributed throughout the differential expansion system 10.

The payload 28 includes, for example, instruments for scientific studies. In one aspect of the present invention, the payload 28 includes a radiosonde which includes a group of instruments for simultaneous measurement and radio transmission of meteorological data, including temperature, pressure, and humidity of the atmosphere. In addition, embedded sensors in the zero-pressure envelope 12 and the superpressure envelope 14 (not shown) can augment other observations and measurements in the payload 28.

Other preferred embodiments of the payload 28 includes instruments and devices for observation, location, command and control, communications, altitude control, and other systems used in real-time data acquisition and real-time tracking of the differential expansion system 10. The payload 28 may also include devices (e.g., an aircraft transponder) for coordination with the Federal Aviation Administration Air Traffic Control during launch, flight and retrieval.

The zero-pressure envelope 12 can be partially inflated, using equipment and techniques known in the art, with the lift gas before launch, with the gas pressure being substantially the same both inside and outside the zero-pressure envelope 12. More specifically, a balloon apparatus of this invention can be prepared for flight by filling the superpressure envelope with an amount of lift gas (e.g. helium or hydrogen) necessary to achieve a desired superpressure. The desired superpressure will be substantially midway between the limits of minimum superpressure (zero) and maximum superpressure that can be sustained by the superpressure envelope. The zero-pressure envelope is then filled with lift gas until the entire balloon including its envelopes, gas transfer device, and payload floats at neutral density. Thus, when the balloon is released in the atmosphere, the lift gas can be transferred in or out of the superpressure envelope without exceeding the pressure limits. Once the balloon is prepared in this way, it can be launched immediately, stored for later release, or transported to a launch site. Differential expansion balloons of this invention can be stored for periods of days to years and can be easily transported by land, sea, or air to the launch site.

As the differential expansion system 10 ascends, the lift gas inside the zero-pressure envelope 12 expands to maintain the zero pressure difference, and the volume contained within the zero-pressure envelope 12 increases. The differential expansion system 10 can maintain altitude by pumping lift gas (i.e., transferring gases from the zero-pressure envelope 12 to the superpressure envelope 14) when it goes too high, where the expanding lift gas can threaten to rupture the zero-pressure envelope 12.

To make the differential expansion system 10 ascend, the gas transfer device 16 releases lift gas from the superpressure envelope 14 into the zero-pressure envelope 12. The zero-pressure envelope 12 grows causing the total volume of the differential expansion system 10 to increase and the balloon to ascend. The zero-pressure envelope 12 expands while the superpressure envelope 14 remains at substantially a constant volume. The entire differential expansion system 10 therefore increases in volume, becomes less dense, and rises. When the gas transfer device 16 pumps the lift gas from the zero-pressure envelope 12 into the superpressure envelope 14, the total volume of the differential expansion system 10 decreases and the balloon descends.

At night, the lift gas in the zero-pressure envelope 12 cools and contracts. In this case, the lift gas from the superpressure envelope 14 can be released into the zero-pressure envelope 12 to compensate for the drop in temperature. In contrast, the zero-pressure envelope 12 expands and gains buoyancy when the zero-pressure envelope 12 is heated at sunrise (or after passing under a cloud). In response, the differential expansion system 10 can initiate the transfer device 16 to transfer lift gas from the zero-pressure envelope 12 to the superpressure envelope 14 at sunrise to remove the excess buoyancy. The amount of sunrise work is equivalent to the energy required for (at most) a few kilometers of vertical altitude change (depending on the material selected for the zero-pressure envelope 12 and whether the zero-pressure envelope 12 contains provisions for minimizing the effects of solar heating).

The preceding and other aspects relating to the operation of the differential expansion system 10 of the present invention can be considered in the context of the relationship(s) between the volumes of zero-pressure envelope 12 and the superpressure envelope 14, the altitude range, and the total mass of the differential expansion system 10, as expressed by isothermal atmosphere equations (1) through (4):

$$P_{SP} = \alpha \cdot P_0 \cdot \exp\left(\frac{-Z_{Min}}{H}\right) \quad \text{(Eq. 1)}$$

$$V_{SP} = \frac{M}{\rho_0} \cdot \exp\left(\frac{Z_{Min}}{H}\right) \quad \text{(Eq. 2)}$$

$$V_{ZP,Embodiment1} = \frac{M}{\rho_0} \cdot \left(\exp\left(\frac{Z_{Max}}{H}\right) - \exp\left(\frac{Z_{Min}}{H}\right)\right) \quad \text{(Eq. 3)}$$

$$V_{ZP,Embodiment2} = \frac{M}{\rho_0} \cdot \exp\left(\frac{Z_{Max}}{H}\right) \quad \text{(Eq. 4)}$$

Wherein, $\alpha$=Fractional increase in lift gas temperature during the day (0.01 to 0.2)

$P_{SP}$=Superpressure required inside balloon envelope (N/m$^2$)

$Z_{Max}$=Maximum design altitude (km)
$Z_{Min}$=Minimum design altitude (km)
H=Atmospheric scale height (km)
$P_0$=Air pressure at sea level (approximately $10^5$ N/m$^2$)
$\rho_0$=Air density at sea level (approximately 1.2 kg/m$^3$)
M=Total mass of the balloon including payload, envelopes, lifting gas (kg)
$V_{SP}$=Volume of the superpressure balloon (m$^3$)
$V_{ZP}$=Volume of the zero-pressure balloon for Embodiment 1 and 2 above (m$^3$)

For small altitude ranges (e.g., less than a few kilometers), the isothermal atmosphere equations 1 though 4 provide a reliable estimate of the size of the design parameters (e.g., the size of the compartments for the superpressure envelope and the zero-pressure envelope) for the differential expansion system 10 of the present invention. For example, using equations 1 through 4, one skilled in the art can calculate the approximate volume of the zero-pressure envelope, the approximate volume of the superpressure envelope, and the approximate superpressure required inside the superpressure envelope. These three key design parameters vary, depending on, for example, the desired altitude range and/or the total mass of the balloon system contemplated, as can be seen from the inclusion of $Z_{max}$, $Z_{min}$, and M which account for the maximum design altitude, the minimum design altitude, and the total mass of the balloon system, respectively.

More specifically, the relationships expressed by Eqs. 1 through 3 can be used to provide initial operating characteristics/parameters (i.e., the initial size of the envelopes) for various embodiment of this invention. For example, the superpressure required inside the superpressure envelope 14 can be approximated by Eq. 1. The size/volume of the superpressure envelope 14 can be approximated by Eq. 2. The size/volume required for the zero-pressure envelope 12 can be estimated by Eq. 3. Similarly, the relationship expressed by Eq. 4 refers to the approximate size/volume for the zero-pressure envelopes of the embodiments shown in FIGS. 2a and 2b, which are described below. For instance, the volume or size of a superpressure envelope is, optimally, sufficient to maintain a balloon apparatus at a lowest, pre-determined altitude. Size/volume variations can be made, as desired. The superpressure envelope volume can vary from that sufficient to maintain a lowest, pre-determined altitude to about 10% thereof, depending upon desired operational efficiency and related low altitude concerns.

Additionally, in accordance with the method(s) of this invention, the relationships expressed by Eqs. 1 through 4 can be used to to approximate the transfer of the lift gas from the superpressure envelope to the zero-pressure envelope, and vice-versa. For example, after $Z_{min}$ (the minimum design altitude) is used to approximate the initial size/volume of the zero-pressure envelope 12, $Z_{min}$ can be replaced by $Z_{target}$ (the targeted/desired altitude) in Eq. 3 to determine the size/volume of the zero-pressure envelope 12 at the desired altitude. With the approximation provided for by Eq. 3 using $Z_{target}$, one skilled in the art can determine the approximate amount of lift gas required to be transfer into or out of the zero-pressure envelope 12 (depending on the current altitude of the zero-pressure envelope 12 and whether the desired altitude results in ascending or descending the balloon system). Similarly, the $Z_{max}$ variable of Eq. 4 can be replaced by $Z_{target}$ to modify Eq. 4 to provide an approximation of the size/volume of the zero-pressure envelopes of the embodiments of FIGS. 2a and 2b. at the desired altitude.

Figure 2A:
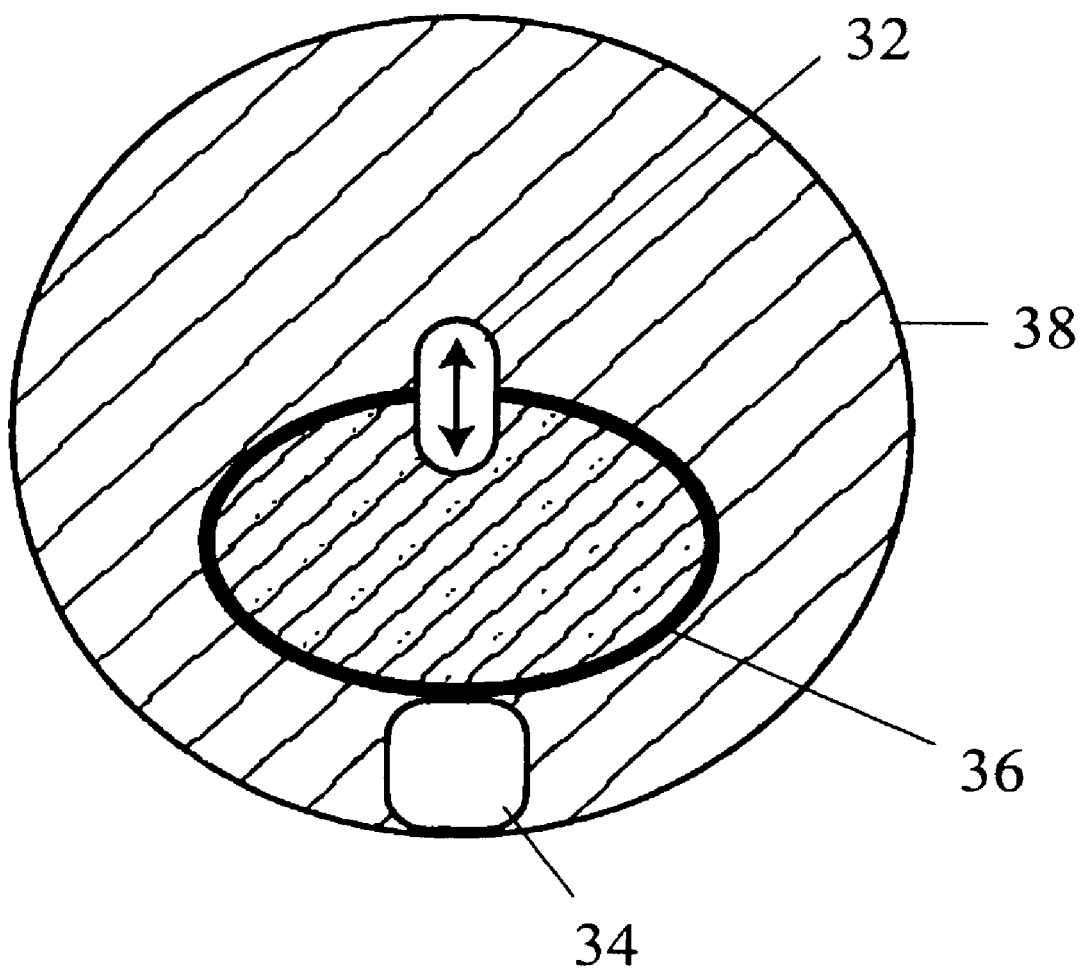
FIG. 2a is a simplified representation of a compact embodiment of the differential expansion system shown in FIG. 1.

Referring to FIG. 2a, and alternatively FIG. 2b, below, there is shown another aspect of the present invention in which the an apparatus and/or system is designed to have a compact configuration 30 in which a superpressure envelope 36 is contained within a zero-pressure envelope 38. The embodiment shown in FIG. 2a operates in a similar manner as the embodiment of FIG. 1. The zero-pressure envelope 38 provides a protective housing (or hull) for the remaining elements of differential expansion system 10 of the present invention. In this embodiment, a pump 32, a payload 34, and the superpressure envelope 36 are placed inside the zero-pressure envelope 38 to help minimize exposure to the elements and/or otherwise create a more compact and durable package. Alternatively, the payload 34 can be located outside the hull of the zero-pressure envelope 38.

Figure 2B:
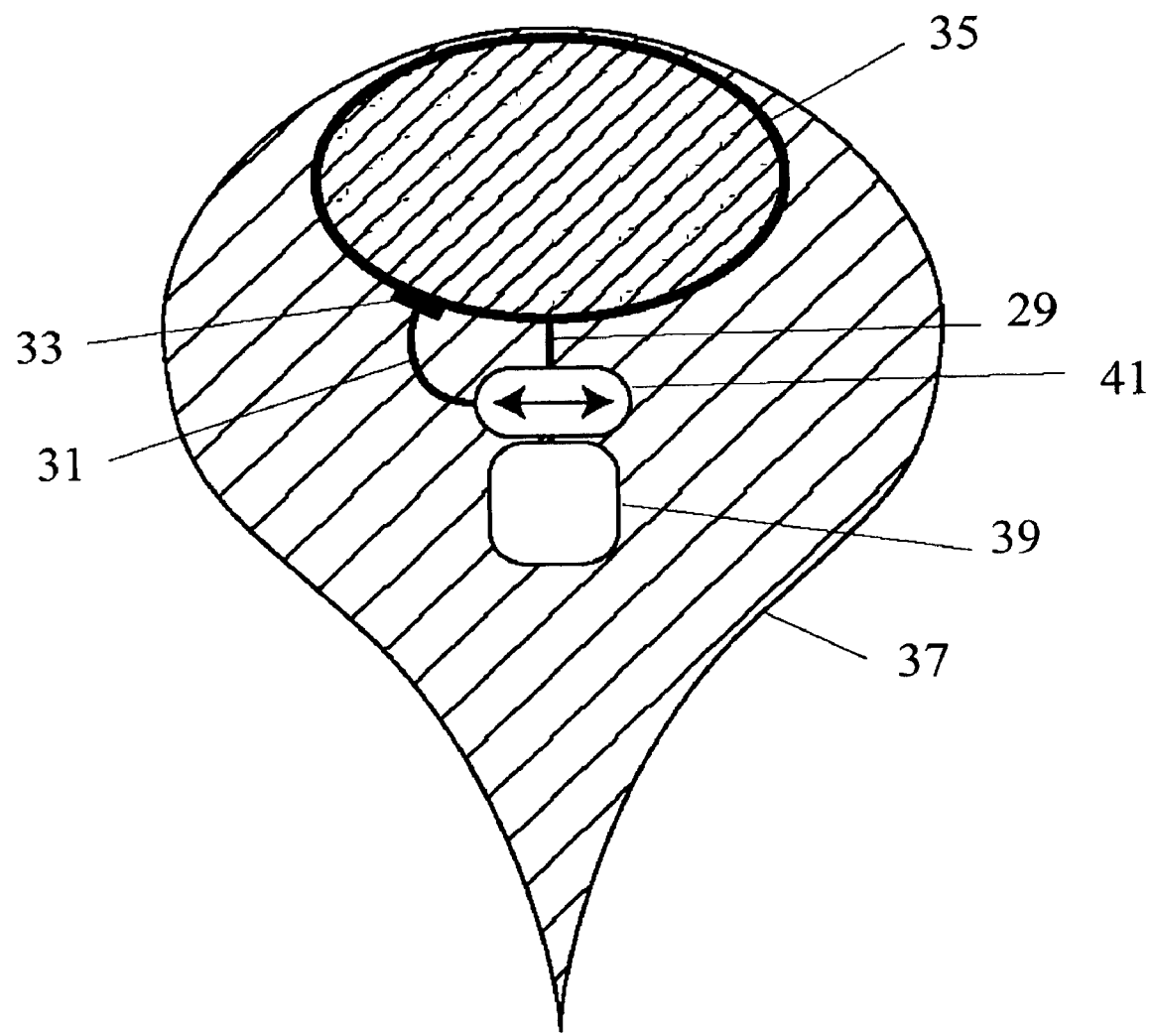

Similar to the compact embodiment shown in FIG. 2a, FIG. 2b shows a superpressure envelope 35 attached to the apex of a zero-pressure envelope 37 (in the bubble that forms when the zero-pressure envelope 37 is partially inflated). At least for small differential systems (less than substantially 10 kg payload), the superpressure envelope 35 may be suspended from the apex of the zero pressure envelope 37 using, for example, double-sided tape, glue, or heat sealing. Alternatively, the superpressure envelope 35 may be suspended from inside the zero pressure envelope 37 using support lines affixed to the apex of the zero-pressure envelope 37 using techniques known in the art.

For the purposes of illustration, three or more support lines 29 joined to the apex of the zero-pressure envelope 37, may, for example, come down on three opposite sides of the superpressure envelope 35 (at 0, 120, 240 degrees on the compass) and join at the base of the superpressure envelope 35.

A payload 39 and a gas transfer device 41 is suspended below the superpressure envelope 35 using the support lines 29. A gas line 31 connects the gas transfer device 41 to a connection fitting 33 which provides access to the inside of the superpressure envelope 35. Optionally, the payload 39 and the gas transfer device 41 can be encased in foam or other material such that they will not cut or otherwise harm any envelope material that they contact.

One skilled in the art will recognize that larger balloons with payloads greater than substantially 10 kg will require more elaborate suspension systems with multiple lines and multiple attachment points distributed on the surface of the zero-pressure envelope 35. Such suspension systems are well developed and are familiar to those skilled in the art.

The arrangements shown in FIGS. 2a and 2b are highly advantageous because any leakage of lift gas from superpressure envelopes 35 and 36 is contained within zero-pressure envelopes 37 and 38, respectively, rather than lost to the atmosphere. Since zero-pressure envelops are, in general, far less susceptible to leaks than superpressure envelopes/balloons, the arrangements in FIGS. 2a and 2b allow for long-duration flights using superpressure envelopes of ordinary quality and cost. The compact configurations of FIGS. 2a and 2b further provide the advantage of minimizing the wetted area and hence any weight gain from precipitation. The compact configurations also minimize the possibility for tangling and improper deployment, especially during a launch in windy conditions.

Figure 3:
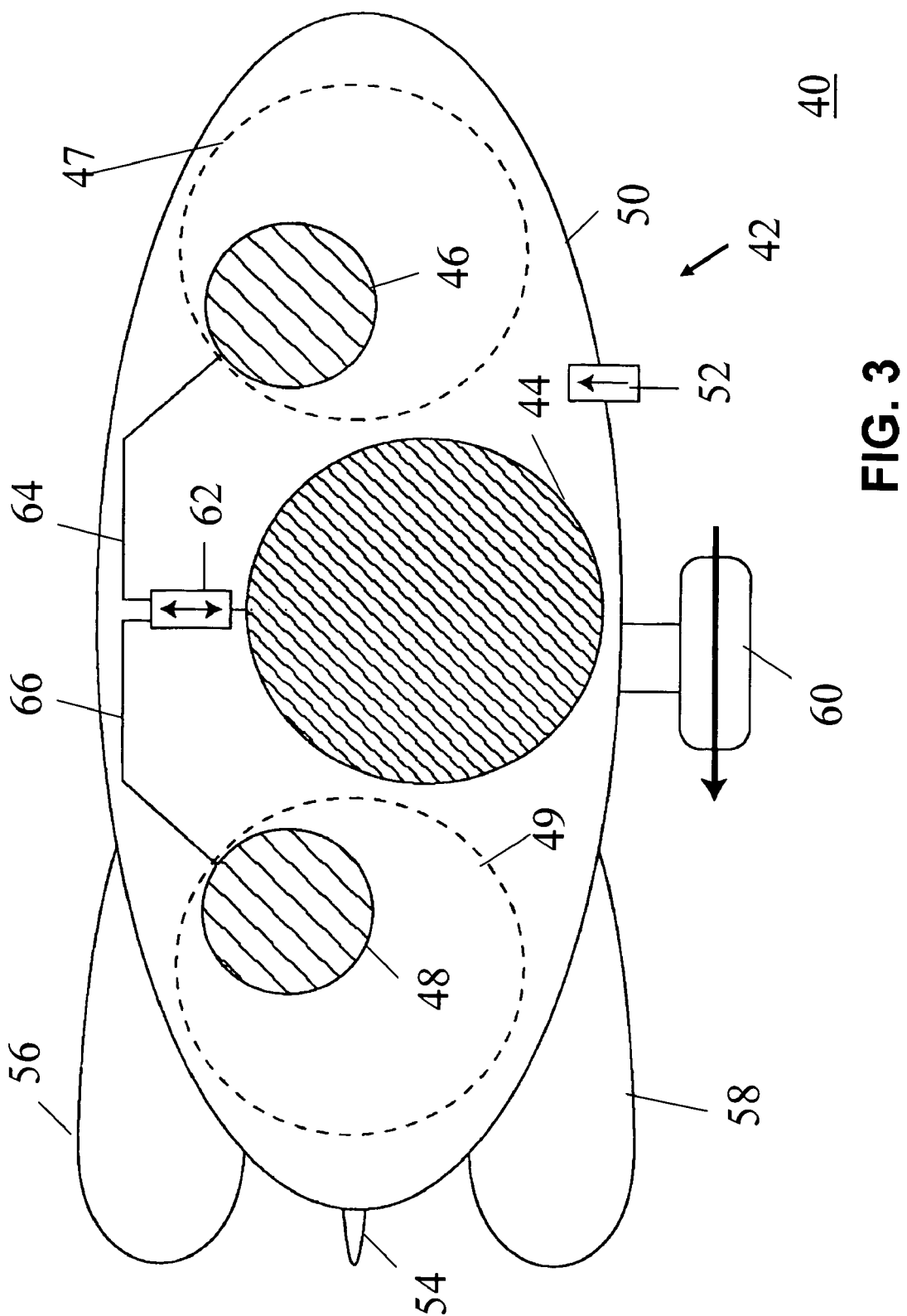
FIG. 3 is a simplified representation of a lighter-than-air craft incorporating various principles of the present invention.

Referring next to FIG. 3, there is shown an alternate embodiment, a lighter-than-air ("LTA") craft 40, incorporating the differential expansion system 10 of the present invention. As shown, the LTA craft 40 includes an airship 42, such as a blimp or dirigible. Preferably, the airship 42 has a shape and structure that enable it to fly and maneuver (e.g., a blimp shape).

The airship 42 includes a low-pressure envelope 50 which encloses a superpressure envelope 44 and two zero-pressure envelopes 46 and 48. The low-pressure envelope 50 is generally cigar-shaped, for aerodynamic purposes, and made of a durable, airtight, lightweight fabric (e.g., polyester composites). The low-pressure envelope 50 allows for the expansion of the zero-pressure envelopes 46 and 48. The airship 42 also includes a low-pressure gas-transfer device 52 which serves to maintain the low-pressure envelope 50 in a fully inflated and substantially rigid form. The zero-pressure envelopes 46 and 48 are at zero-pressure with respect to the pressure inside the low-pressure envelope 50 but are not, in the present embodiment, at exactly zero-pressure with respect to the surrounding environment.

The zero-pressure envelopes 46 and 48 act as balloonets, one fore and one aft, respectively. The zero-pressure envelopes 46 and 48 are deflated or inflated (as shown by the dashed lines 47 and 49) to make the airship 42 descend or ascend. The zero-pressure envelopes 46 and 48, which can be differentially inflated, are used to control the trim, pitch, or levelness of the airship 42.

Alternatively, the airship 42 can include one or more superpressure envelopes and/or one or more zero-pressure envelopes. For example, the airship 42 can include a plurality of zero-pressure envelopes to increase the sensitivity of controls for the LTA craft 40.

In addition to the superpressure envelope 44 and the zero-pressure envelopes 46 and 48, the airship 42 includes a gas transfer device 62 similar to the gas transfer device 16 described in FIG. 1. The airship 42 also includes other support elements, such as gas lines 64 and 66, similar to the system described in FIG. 1.

The airship 42 also includes flight control surfaces which are preferably stiff, movable parts of the airship 42 that are mounted to the tail of the airship 42. The flight control surfaces include a rudder 54 and elevators 56 and 58. The rudder 54 is used to steer the airship 42 to the starboard or port directions (yaw axis). The elevators 56 and 58 are used, in conjunction with the zero-pressure envelopes 46 and 48, to control the angle of ascent or descent (pitch axis) of the airship 42. The flight control surfaces are operated by a pilot as he/she flies the airship 42 or may be remotely operated (e.g., via wireless or satellite communications), or may be autonomously operated under computer control. Optionally, the LTA craft 40 includes a gondola 60. The gondola 60 is attached to the airship 42 by means known in the art. The gondola 60 can hold a crew, passengers, and/or a payload. Preferably, the airship 42 includes a propulsion system (not shown) to provide the thrust necessary to move the airship 42 forward. In one aspect, the propulsion system includes two engines located on either side of the gondola 60. Alternatively, the propulsion system can be coupled to the low-pressure envelope 50.

As described above, the differential expansion system 10 relies, at least in part, on the transfer of lift gas between the zero-pressure envelope 12 and the superpressure envelope 14. Consequently, the differential expansion principles of the present invention appear to run against the current thinking in the field of art, manifested in the air ballast system, in which a heavier gas (i.e., a non-lift gas), such as air, is required to change the buoyancy of balloons. One insight that appears to be missing from conventional reasoning is the fact that as lift gas is pumped into the superpressure envelope 14, the entire differential expansion system 10 descends, and therefore the ambient pressure rises. The pressure (force) across the superpressure envelope 14 remains substantially constant across all altitudes.

Figure 4:
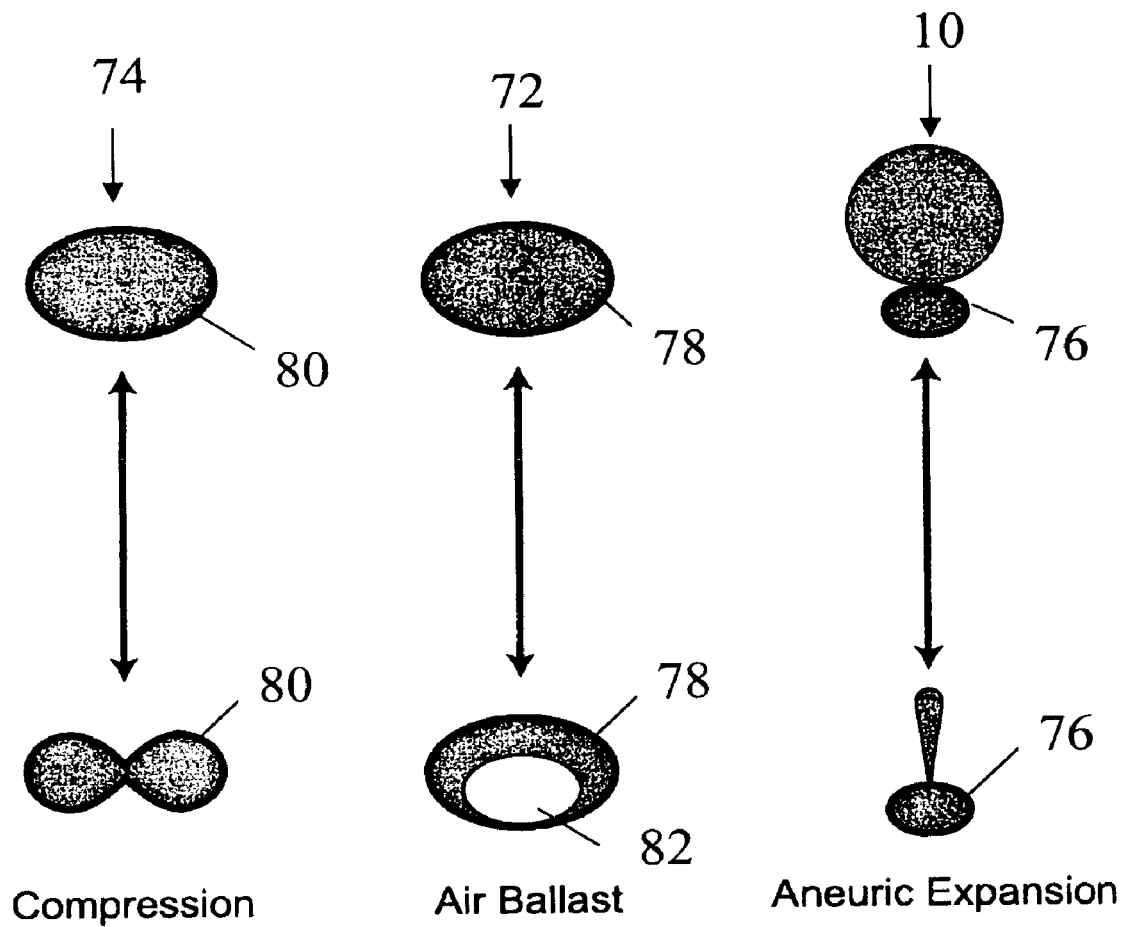
FIG. 4 illustrates three methods of buoyancy control and demonstrates the weight and cost savings of the differential expansion system of the present invention as compared to the prior methods shown.
Figure 6:
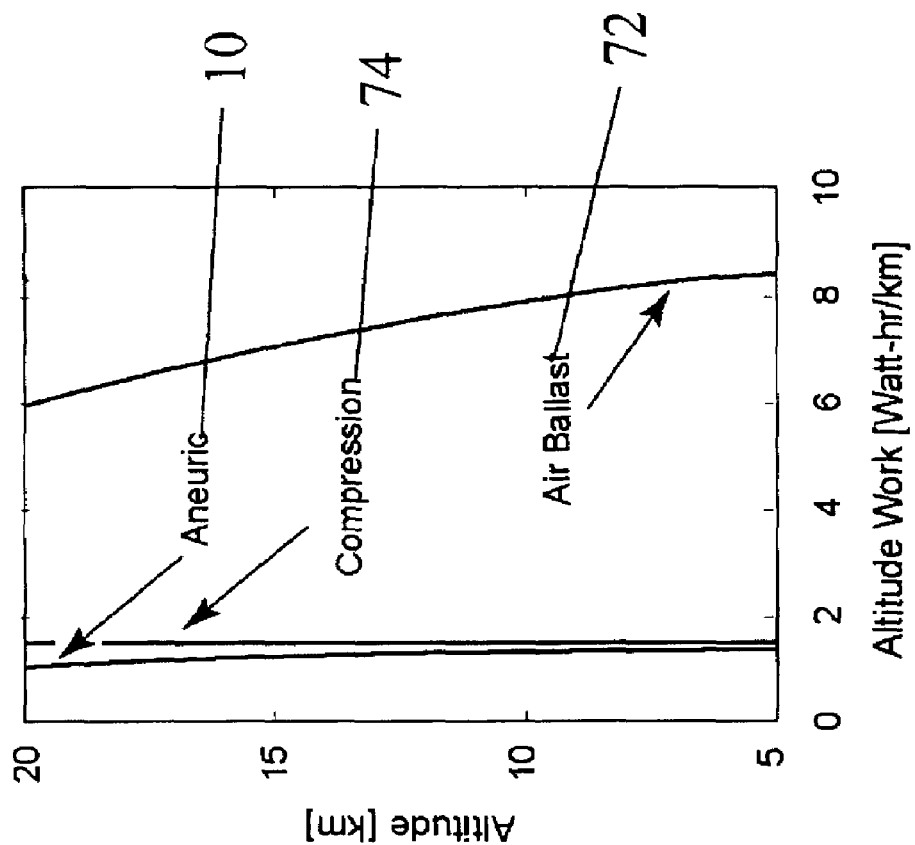
FIG. 6 is a graph of the approximate energy required for altitude change versus altitude for three methods of buoyancy control.
Figure 5:
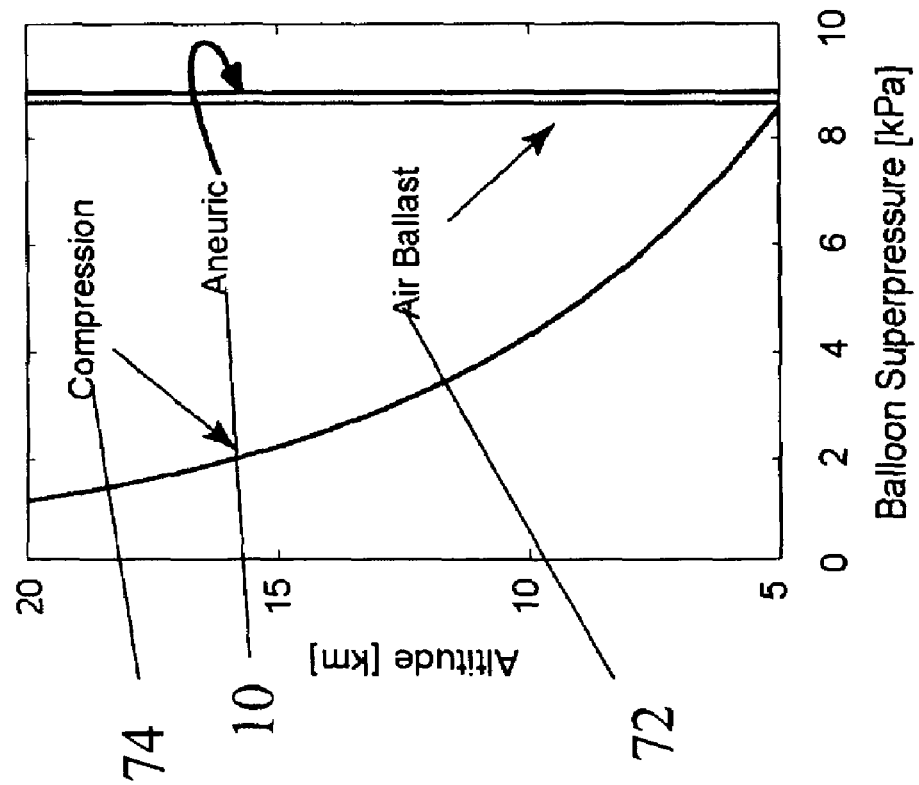
FIG. 5 is a graph of approximate superpressure versus altitude for three methods of buoyancy control.

Referring now to FIGS. 4 through 6, there are shown illustrations comparing the present invention with the air ballast system 72 and the direct compression system 74. With both the air ballast system 74 and the direct compression system 72, the heavy and expensive superpressure balloons must be large enough to contain the lift gas at the highest target altitude. In the differential expansion system 10 of the present invention, the superpressure envelope contains substantially all the lift gas only at the lowest target altitude. Since the volume of the lift gas grows exponentially with altitude, the differential expansion system 10 uses a much smaller superpressure envelope for a given total lift capacity and altitude range. This smaller superpressure envelope has a smaller radius of curvature and is therefore capable of sustaining the same internal superpressure using lighter-weight envelope materials. Thus the weight savings of the differential expansion system 10 is compounded, greatly reducing the size of the balloon required to lift a given payload and the corresponding energy required for altitude control.

For example, the illustration of FIG. 4 compares the differential expansion system 10 of the present invention used in balloon buoyancy control with the air ballast system 72 and the direct compression system 74. As can be seen, the balloons of the differential expansion system 10 have the smallest superpressure envelope as compared to the superpressure envelope 78 and 80 of the air ballast system 72 and the direct compression system 74, respectively. The smaller superpressure envelope 76 of the present system 10 results in a considerable savings in weight and cost. For the same material strength, a smaller superpressure envelope can also contain a greater internal pressure.

Referring to FIGS. 5 and 6, plots of "superpressure versus altitude" (FIG. 5) and "required energy per kilometer altitude change versus altitude" (FIG. 6) of the differential expansion system 10, the air ballast system 72 and the direct compression system 74 are shown. The plots of FIGS. 5 and 6 compare the energy required for altitude control for the three systems, 10, 72 and 74.

Referring to FIG. 5, the balloons of all three systems, 10, 72 and 74, are designed to withstand the same maximum internal pressure. While the direct compression system 74 appears to be efficient in terms of energy consumption (FIG. 6), engineering obstacles, such as complexity, limited altitude range, and twisted balloon deployment, limit its practicality. Of the remaining options, the differential expansion system 10 of the present invention uses much less energy than the air ballast system 72 as shown in FIG. 6.

A closer examination of FIG. 6 indicates that the energy required for altitude control is lowest for the differential expansion system 10 and highest for the air ballast system 72.

The differential expansion system 10 has an energy consumption that approaches that of the direct compression system 74 at the low end of the altitude range. The energy consumption shown in FIG. 6 does not account for the additional efficiency of the differential expansion system 10 due to the lighter weight of the differential expansion system 10. Furthermore, the comparisons shown in FIGS. 5 and 6 are based on an isothermal atmosphere. In a more realistic atmosphere with a lapse rate (decreasing temperature with altitude), the energy efficiency advantages of the differential expansion system 10 become even greater in comparison with the air ballast system 72.

From the perspective of energy consumption only, the direct compression system 74 appears also to be a desirable system for altitude control. Several difficulties of the direct compression system 74, however, preclude the use of the direct compression system 74 in many, if not all, applications. First, the direct compression system 74 requires enormous force and therefore a powerful and heavy winch. Second, geometric constrains severely limit the altitude range; a pumpkin type superpressure balloon, for example, can be compressed to approximately 50% of its original volume which translates into an altitude range of only a few kilometers. Finally, the direct compression system utilizes an expensive and complex pumpkin balloon, which has a tendency to become severely distorted during the compression process. Thus, because of mechanical complexity of the direct compression system 74, limited altitude range, and requirement for a large superpressure balloon, the direct compression system 74 is at a disadvantage in light of the differential expansion system 10 of the present invention.

As for the air ballast system 72, its power consumption is unnecessarily high because both the lift gas and ballast air must be compressed by the pump at low altitudes while, at high altitudes, the superpressure balloon is excessively large. In other words, conventional air ballast systems suffer from inefficiency at both ends of their altitude range. Furthermore, since all the lift gas is contained in a heavy (and at least partially opaque) superpressure envelope, radiative heating and cooling demand that the superpressure be set higher for the air ballast system 72 than for the differential expansion system 10. Other problems with the air ballast system 72 arise from the fact that moisture in the ambient air that is pumped into the inner bladder can condense and freeze, potentially tearing the inner bladder.

Figure 7:
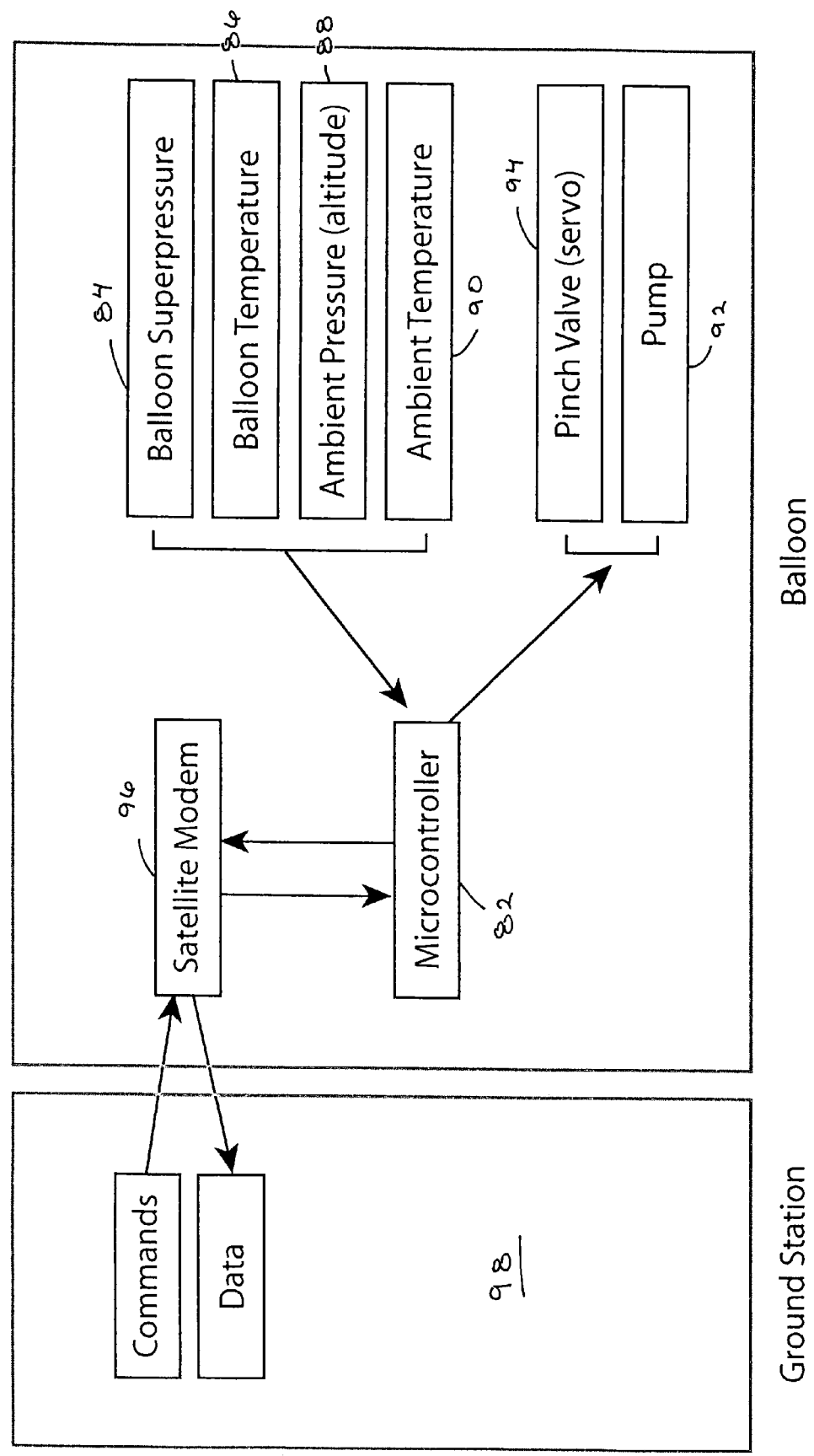
FIG. 7 is a block diagram illustrating optional electronic components useful in conjunction with altitude control.

FIG. 7 shows a block diagram of control electronics of the sort useful in conjunction with a differential expansion balloon of this invention. A microcontroller 82 is the interface between the sensors 84-90, the pump 92, the pinch valve 94 and the satellite modem 96. The target altitude is calculated by the microcontroller based on pre-flight inputs or can be sent to the microcontroller from the ground station 98 via satellite modem. Based on input data, the microcontroller operates the pump and the valve. For example, if the balloon is at 1000 meters altitude and the target altitude was 1500 meters, the microcontroller can open the valve until the balloon begins to ascend at a predetermined rate. As the balloon reaches its target altitude, the microcontroller can turn on the pump until the balloon stops ascending. Balloon altitude and ascent rate can be determined by the pressure altitude input or by other means such as a gps receiver, or a variometer. The microcontroller can comprise any device capable of processing input data, making decisions, and controlling the gas transfer device. A radio transmitter/receiver can be used in place of the satellite modem for direct communication with other balloons, aircraft, or ground station(s). In certain embodiments, all electronic components, including the gas transfer device, can be powered by a battery and a photovoltaic panel which have sufficient capacity to operate the balloon apparatus continuously. All such components, both electronic and power generating, are commercially-available and well-known to those skilled in the art made aware of this invention.

Figure 8:
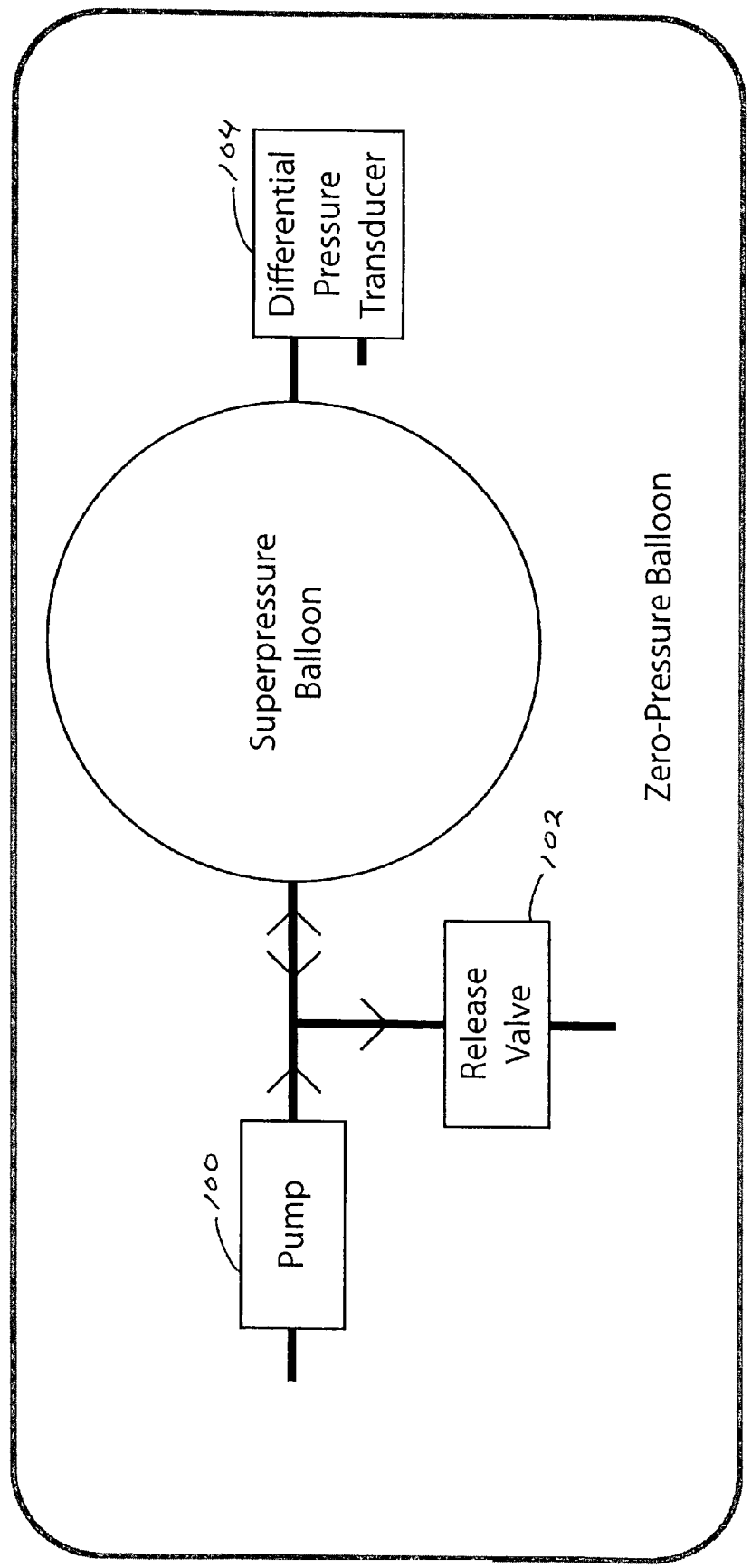
FIG. 8 is a schematic diagram of a gas transfer device, in accordance with this invention.

FIG. 8 shows a block diagram of a gas transfer device, comprising a pump 100 and valve 102, and a superpressure balloon within a zero-pressure balloon. Such components, designed as shown, can be used in the embodiment of FIGS. 2a and 2b. Pump 100 transfers lift gas from the zero-pressure balloon to the superpressure balloon while valve 102 releases lift gas from the superpressure balloon into the zero-pressure balloon. A differential pressure transducer 104 measures the pressure difference between the zero-pressure balloon (ambient pressure) and the superpressure balloon. This pressure difference, known as the superpressure, can be one of the inputs into the microcontroller of FIG. 7. The pump, for example, can be turned on until the superpressure reached a pre-determined set point. Alternatively, a maximum superpressure can be set so as not to damage the superpressure balloon.

Figure 9:
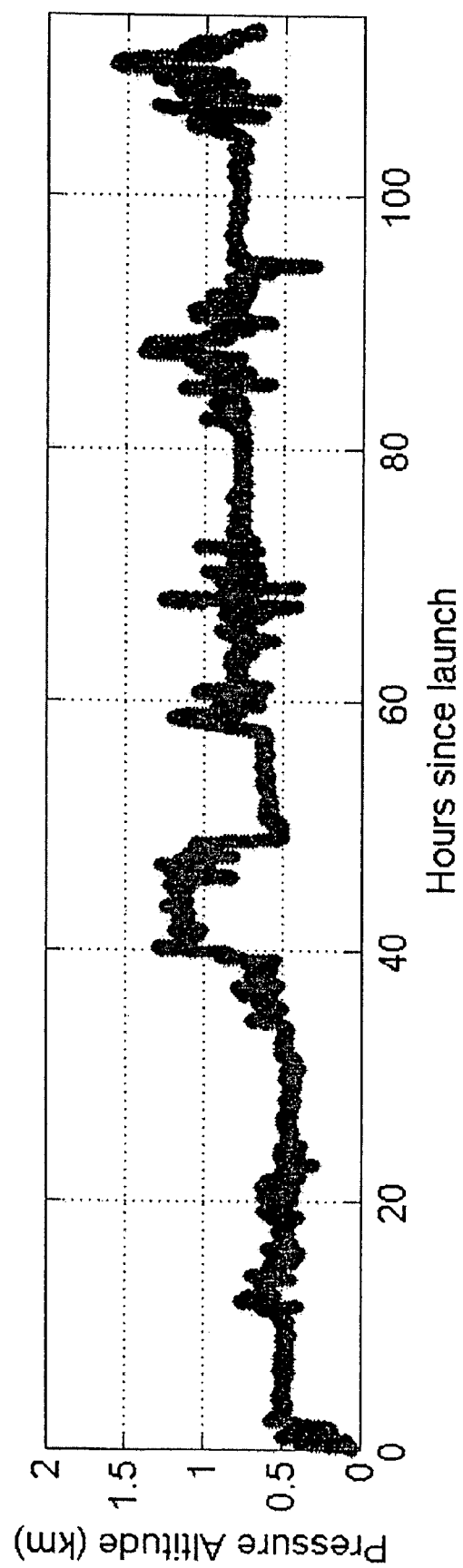
FIG. 9 is a graphic representation of measured altitude over time, for one non-limiting embodiment of this invention.

FIG. 9 shows the measured altitude profile of a balloon, operated and controlled in accordance with this invention, launched from Centre Island, N.Y., on the evening of Aug. 9, 2004. The target altitude was set to 500 meters (0.5 km) for the first 40 hours of flight, to 1200 meters (1.2 km) between 40 and 48 hours, to 600 meters (0.6 km) between 48 and 57 hours and to 800 meters (0.8 km) for the remainder of the flight. The altitude control is somewhat less stable during the day (e.g. at 20 and 60 hours) because the balloon must constantly fight changes in solar heating due to passing clouds, for example. The altitude is stable at night (e.g. at 80 and 100 hours). The entire plot shows five consecutive night-day cycles. The balloon was ultimately brought down by rain after traversing about 1900 miles over approximately 120 hours in the air. Based on the observed loss rate of helium, however, the balloon could have remained aloft for more than 20 days.

The precision and the accuracy of the altitude control can be, under certain flight conditions, largely a function of the program run by the microcontroller and ability of the pump to quickly pump off extra buoyancy due to solar heating. The profile in FIG. 9 is relatively noisy given the relative sophistication of the control program used. Further, the pump was undersized in order to save weight, and the zero-pressure envelope was constructed from a low-emissivity metalized film that is particularly prone to solar heating. Microcontrollers and control program software are well-known to those in the art, any of which can be used effectively in accordance with this invention. Altitude control can be enhanced through continued developments in such technologies, incorporation of which are contemplated within the broad scope of this invention.

It may therefore be appreciated from the above detailed description that the present invention that it provides numerous advantages over the prior art and no substantial disadvantages. As shown and as described above, for a given payload mass and altitude range, the differential expansion system 10 has significantly lower energy consumption per unit altitude change and an exponential reduction in the size of the heavy (and expensive) superpressure envelope 14. The reduction in size also provides a corresponding reduction in the stresses acting on the superpressure envelope 14. The weight savings provide an additional energy savings (further increasing energy efficiency).

Furthermore, the differential expansion system 10 of the present invention calls for lower superpressure at high altitudes because most of the required lift gas is in a thin transparent envelope (the zero-pressure envelope 12) and thus has a smaller day-to-night temperature change than an equivalent air ballast system. There is also a much lower tendency for ice damage because ambient air is not introduced into the envelopes of the differential expansion system 10.

Thus, in comparison with state-of-the-art, the present invention is lighter, more energy efficient and less expensive to construct. The differential expansion system 10 also has a larger altitude range, a higher maximum altitude and is better suited to use in cold and wet conditions (e.g., in clouds, fog, and rain).

It may therefore be seen that the present invention provides a differential expansion system which combines the mechanical simplicity of air ballasting, the low cost of fluid vaporization, and energy efficiency of direct compression to achieve an degree of performance for altitude control that is superior to the existing systems. The present invention provides an aneuric altitude control system that is suited for applications where light weight, low cost, low power consumption, and maximum altitude range are desired. The present invention further provides an altitude-controlled balloon that is highly energy efficient. Additionally, the present invention provides an altitude-controlled balloon that is capable of traveling over a large altitude range and is suitable for long duration flights.

Further, the present invention provides an altitude-controlled balloon that uses a relatively small superpressure envelope and an altitude-controlled balloon that minimizes stress on the superpressure envelope. The present invention also provides an altitude-controlled balloon that is configured to contain gas leaks from the high-pressure envelopes to within the zero pressure envelope and minimizes day-to-night temperature changes of the lift gas. Furthermore, present invention provides an altitude-controlled balloon that does not require ambient air to be pumped into a balloonet and thus is less susceptible to ice damage.

In addition, the present invention provides an altitude-controlled balloon that is simple, lightweight, inexpensive, easy to fabricate and presents a lower hazard to aviation. The present invention further provides means for controlling altitude for taking scientific data, landing, or taking advantage of favorable winds for relocation. Further advantages of the present invention include using the balloon for atmospheric soundings, for air mass tracking, for navigation in the atmosphere, and for creating satellite-like constellations for communications, observations, and scientific studies.

The differential expansion system of the present invention is of a construction which is both durable and long lasting, and which will require little or no maintenance to be provided by the user throughout its operating lifetime. The differential expansion system of the present invention is also of inexpensive construction to enhance its market appeal and to thereby afford it the broadest possible market. Finally, all of the aforesaid advantages and objectives are achieved without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

I claim:

1. A differential expansion system for balloon altitude control, said system comprising:
   a volume flexible, zero pressure envelope substantially absent fluid communication with ambient conditions, and a single substantially volume constant envelope, and a lift gas in said envelopes; and
   a gas transfer device in fluid communication with said envelopes, for change of sum envelope volume to control balloon ascent and descent.

2. The system of claim 1 wherein said gas transfer device comprises pump and valve components.

3. The system of claim 1 wherein said gas transfer device comprises a is bi-directional pump.

4. The system of claim 1 comprising a plurality of volume flexible envelopes in fluid communication with said single envelope.

5. The system of claim 1 wherein said single envelope and said gas transfer device are within said volume flexible envelope.

6. The system of claim 1 wherein said gas transfer device comprises a power generation component generating power with lift gas released from said single volume envelope.

7. An atmospheric balloon apparatus comprising first and second envelopes, said first envelope volume flexible and said second envelope consisting essentially of a single volume substantially volume constant envelope within said first envelope, and a gas transfer device in fluid communication with said envelopes, for vertical ascent and descent of said balloon apparatus.

8. The apparatus of claim 7 wherein said first envelope has a volume sufficiently flexible to receive substantially the entirety of a lift gas at a highest pre-determined altitude.

9. The apparatus of claim 8 wherein said second envelope has a volume sufficient to substantially maintain said balloon at a lowest pre-determined altitude.

10. The apparatus of claim 9 wherein said second envelope has a volume from about said sufficient volume to less than about 10% of said sufficient volume.

11. The apparatus of claim 7 wherein at least one of said first and second envelopes comprises a construction minimizing at least one of solar heating and infrared cooling of said balloon apparatus.

12. The apparatus of claim 7 wherein said gas transfer device is within said first envelope.

13. The apparatus of claim 7 as a component of a lighter than air craft.

14. The apparatus of claim 7 further comprising a power generation component.

15. The apparatus of claim 7 wherein said gas transfer device comprises a power generation component generating power with lift gas released from said single volume envelope.

16. A differential expansion balloon system, said system comprising:

a balloon comprising a volume flexible, zero pressure envelope substantially absent fluid communication with ambient conditions, a single substantially volume constant envelope, a lift gas in said envelopes, and at least one data sensor selected from balloon superpressure, balloon temperature, ambient pressure/altitude, ascent/descent rate and ambient temperature data sensors;

a gas transfer device in fluid communication with said envelopes, for change of sum envelope volume to control balloon ascent and descent; and a microcontroller interfaced with each said data sensor and said gas transfer device, said gas transfer device and said sum envelope volume operatively controlled by said microcontroller, responsive to at least one of said data sensors.

17. The system of claim 16 wherein said volume constant envelope is within said volume flexible, zero pressure envelope.

18. The system of claim 16 wherein said volume flexible, zero pressure envelope has a volume sufficiently flexible to receive substantially the entirety of said lift gas at a highest pre-determined altitude.

19. The system of claim 18 wherein said volume constant envelope has a volume sufficient to substantially maintain said balloon at a lowest pre-determined altitude.

20. The system of claim 16 wherein said gas transfer device comprises a power generation component generating power with lift gas released from said constant volume envelope.

* * * * *